Feb. 7, 1928.
Y. H. KOUN
DIRIGIBLE HELICOPTER
Filed June 28, 1927
1,658,290
2 Sheets-Sheet 2
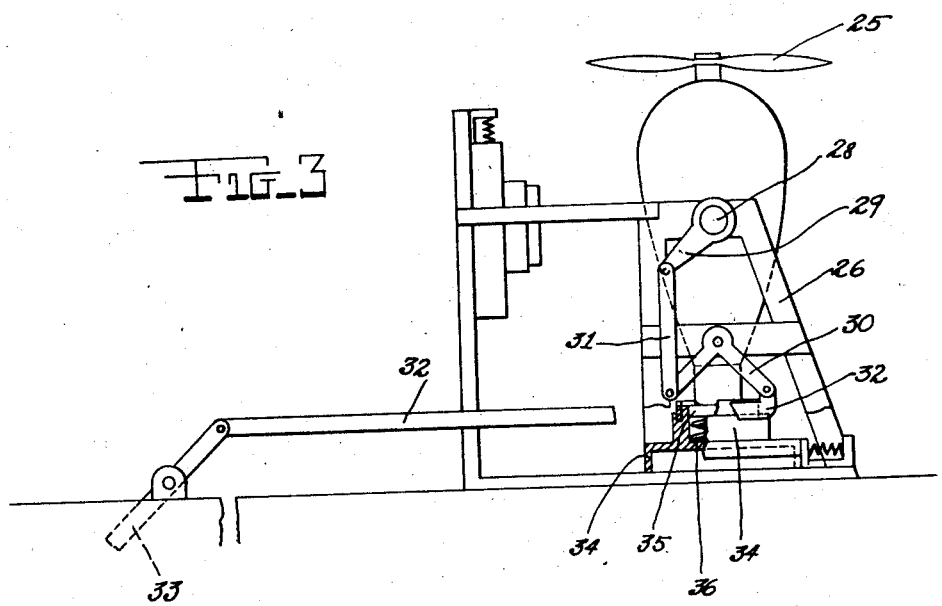
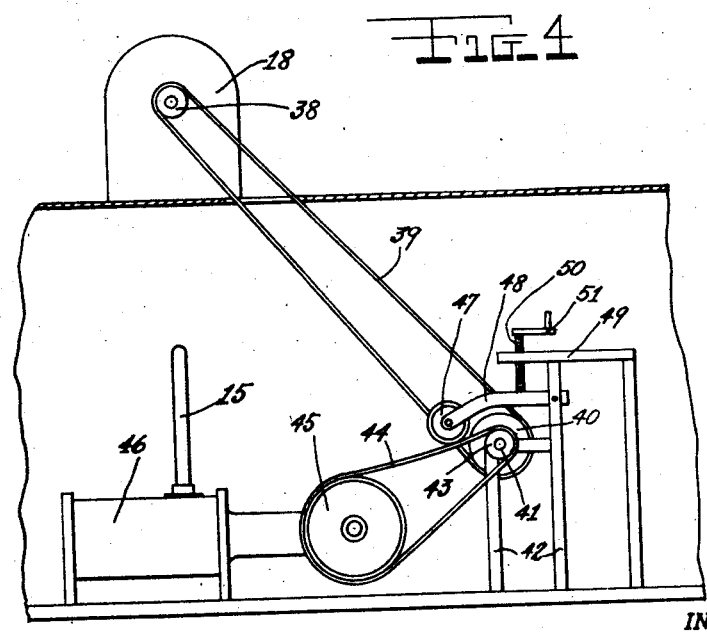
INVENTOR
Y. H. Koun
BY
ATTORNEY Patented Feb. 7, 1928.

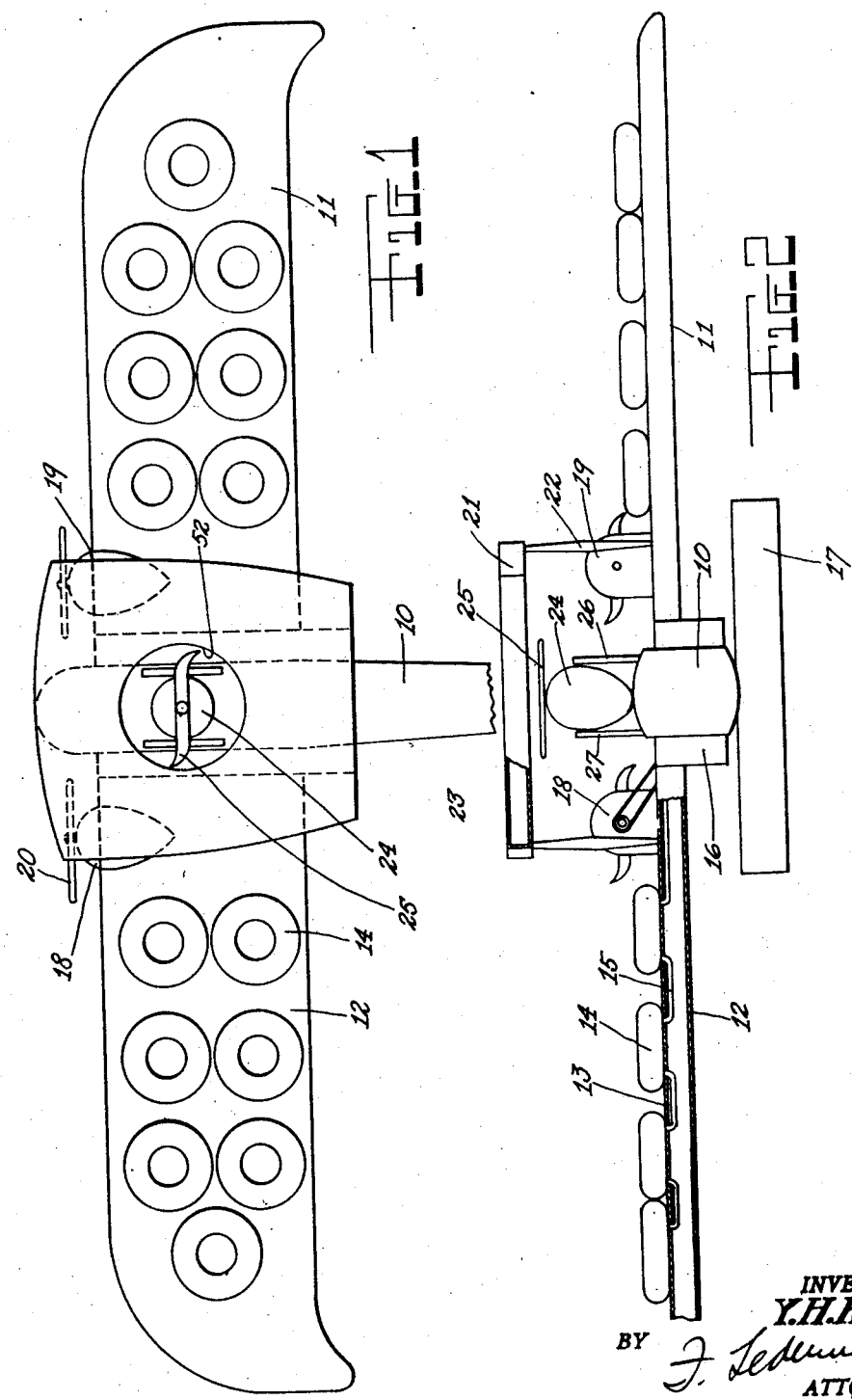

1,658,290

UNITED STATES PATENT OFFICE.

YOUNG HO KOUN, OF NEW YORK, N. Y.

DIRIGIBLE HELICOPTER.

Application filed June 28, 1927. Serial No. 202,026.

The main object of this invention is to provide a type of flying machine which is capable of ascending vertically or at any angle within reasonable limits. The aircraft is so constructed as to permit the same to hover over a certain location indefinitely and to descend either at an angle, as the common aeroplane, or vertically as a helicopter.
Another object of this invention is to provide an aircraft which combines a helicopter and a lighter than air aircraft and is provided with bags which are adapted to be filled with hydrogen gas when the aircraft is to descend vertically without power. The aircraft is also provided with a dirigible motor which may be rotated from the vertical to the horizontal so that the same may be used either as a helicopter engine or for flying in a horizontal direction.

The above and other objects will become apparent in the description below in which characters of reference refer to like-named parts in the drawing.
Referring briefly to the drawing, Figure 1 is a top plan view of the aircraft showing the positions of the propelling members.

Figure 2 is a rear end elevational view of the same showing the location of the hydrogen bags.

Figure 3 is a side elevational view of the dirigible motor and its rotating mechanism.

Figure 4 is a cross sectional view thru the cock pit showing the means for driving the compressor.

Referring in detail to the drawing, the numeral 10 indicates the fuselage of the aircraft. Main sustaining wings 11 and 12 extend outwardly from the fuselage in opposite directions and are of hollow construction thruout. These main wings are located horizontally on the sides of the fuselage and the upper wall 13 of the same support a plurality of ring-like gas bags 14 which are symmetrically arranged. The bags are rigidly mounted on the wings and are connected in series by short lengths of pipe sections 15 which lead into and communicate with tanks 16, the latter being mounted on both sides of the fuselage 10. These tanks are adapted to be normally filled with hydrogen gas which is adapted to be pumped into the gas bags when the aircraft is to descend vertically. The type of aircraft shown is adapted for travel over water and is therefore equipped with a supporting pontoon 17 but a wheeled chassis can be conveniently substituted as required.

A pair of motor housings are mounted immediately to the rear of the entering edges of the main wings 11 and 12 and are indicated by the numerals 18 and 19. These housings contain motors whose crank shafts have propellers 20 fixed thereto and are mounted rigidly on the wings, one motor on each wing.

An auxiliary wing 21 is supported above the fuselage 10 on struts 22. This auxiliary wing serves as a sustaining surface and is of hollow construction and its interior chamber 23 is adapted to receive the fuel oil for the motors.

At a position forwardly and near the front end of the fuselage 10 and slightly to the rear of the motors 19 and 20, and between the latter a dirigible motor 24 mounted in a housing is mounted. The crank shaft of this dirigible motor is equipped with a propeller 25. The housing of the dirigible motor is trunnioned between a pair of stands 26 and 27 which are rigidly secured on the roof of the fuselage 10. The housing has pivot studs 28 projecting therefrom which are anchored in a cradle in the stands. One of these pivot studs has a crank lever 29 fixed thereto. This lever 29 is connected to the bell crank 30, which is mounted pivotally on the side of the stand by a pin, by a link 31. The opposite end of the bell crank has connected thereto the one end of a bar 32 which extends rearwardly to the operator cabin and has a pivoted operating handle 33 pivotally connected thereto. A hollow stand 34 is mounted on the roof of the fuselage 10 between the stand members 26 and 27 and serves as a housing for a reciprocating cushion block 35 which is yieldably seated on the coil spring 36. This block has a flat face which is abutted against by the projecting end of the dirigible motor housing, the end being indicated by the numeral 37.

The rear end of the rigid motor 18 has the crank shaft protruding therefrom and this protruding end has a pulley 38 attached thereto. This pulley has a belt 39 trained about it. The belt extends downwardly at an angle thru the wing 12 of the aircraft into the fuselage 10 and its opposite end is trained about another pulley 40 which is mounted rigidly on a rotatable shaft 41, the shaft being supported on a vertical standard 42. Mounted on the same shaft adjacent the larger pulley 40 is a smaller pulley 43 which has one end of a belt 44 trained about it. This belt 44 extends to the driving wheel 45 of a compressor unit 46 from which the pipe extends to the nearest bags. This belt 44 is loosely mounted on the two pulleys and is brought into driving contact with a pulley 45 by a tightening pulley 47 which is rotatably mounted at one end of a bar 48 whose opposite end is pivotally connected to the standard 42. A leg 49 surmounts the standard 42 and projects directly over the bar 48 and has a treaded opening therein in which is mounted a threaded stud 50 which is provided with a crank arm 51 at its upper end.

The auxiliary wing 21 has an opening formed therein thru which is visible the entire length of the propeller 25 of the dirigible motor when the latter has been rotated to a vertical plane, as is indicated in Figure 1. This opening is indicated by the numeral 52.

The aeroplane described herein is adapted to glide into the air and ascend at an angle when the axes of the three motors are in a horizontal plane. To ascend vertically, the operating handle is swung to the position indicated in Figure 3. This movement rotates the dirigible motor from the horizontal to the vertical and assumes the position indicated in Figure 3 thereby permitting the craft to ascend vertically. It is possible with this type of craft to descend without power. The hydrogen gas used in the craft is normally located in the tanks and before beginning the descent the gas bags are filled with the gas. This is accomplished thru the compressor 46 which is actuated by 45. This is set rotating by tightening the belt 44 thereon thru the elements 47, 48 and 50.

It is to be noted that certain changes in form and construction may be made without departing from the spirit and scope of the invention.

I claim:

1. A machine of the class described comprising a stream-lined fuselage, sustaining wings extending from said fuselage in opposite directions, annular gas bags seated on said wings, means for inflating and deflating said bags, an auxiliary wing above the fuselage having an opening therein, a motor pivotally mounted beneath the opening, studs projecting from said motor, a propeller driven by said motor, an arm extending angularly downward from one stud when said motor is located vertically, and levers connected to said arm adapted to rotate the latter to swing the motor from the vertical to the horizontal.

2. A machine of the class described comprising a stream lined fuselage, sustaining wings extending from said fuselage in opposite directions, annular gas bags seated on said wings, a compressor in said fuselage for inflating the gas bags, an auxiliary wing above the fuselage having an opening therein, a motor pivotally mounted on said fuselage beneath the opening in the auxiliary wing, a propeller driven by said motor a standard supporting said motor, a crank connected to said motor, a bell crank pivoted on the standard, and levers connecting the crank and bell crank and adapted to rotate the motor from the horizontal to the vertical.

In testimony whereof I affix my signature.

YOUNG HO KOUN.